UNITED STATES PATENT OFFICE.

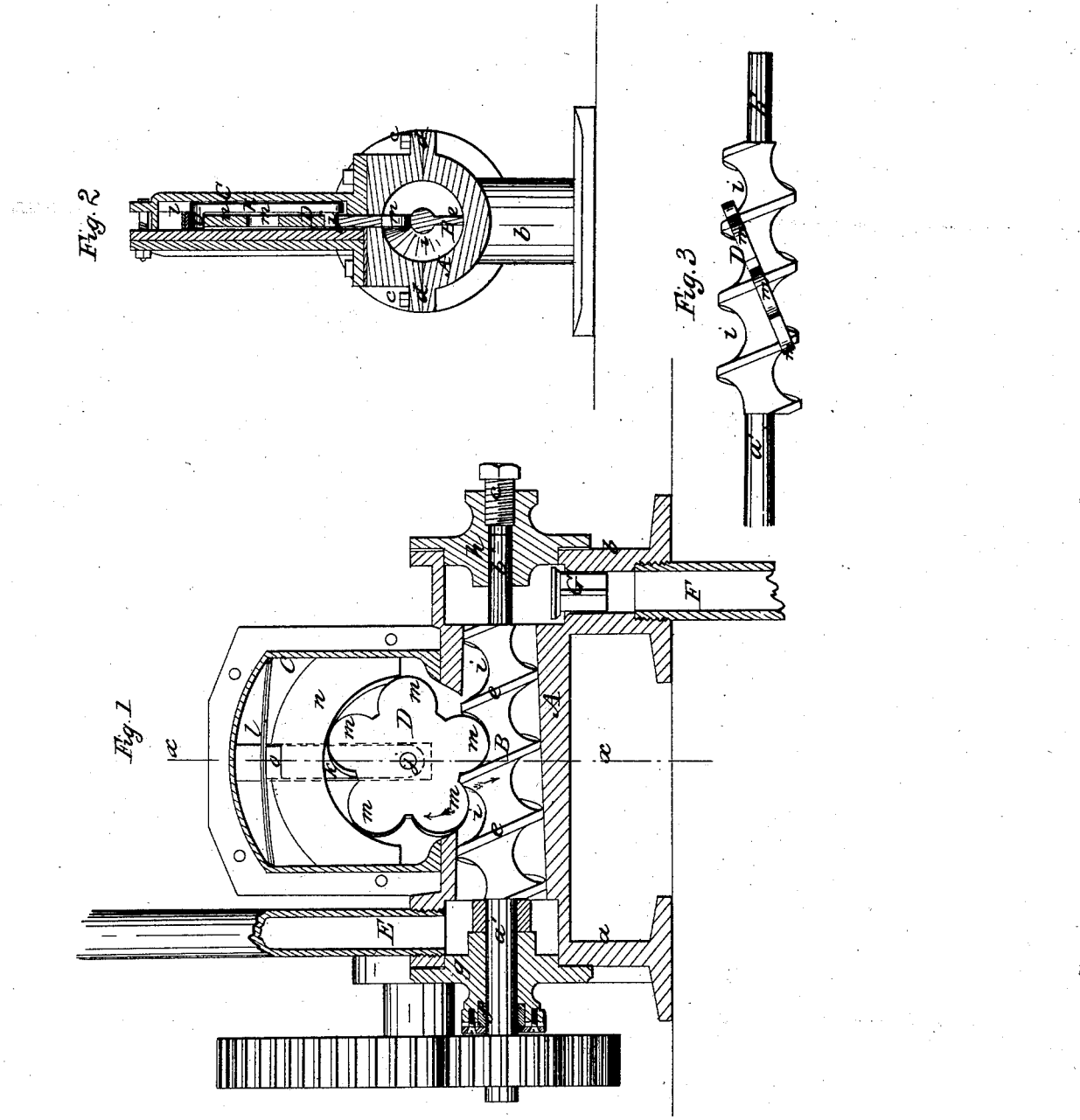

ROBERT RAMSDEN, OF SOUTH EASTON, PENNSYLVANIA.

ROTARY PUMP.

Specification of Letters Patent No. 17,516, dated June 9, 1857.

*To all whom it may concern:*

Be it known that I, ROBERT RAMSDEN, of South Easton, in the county of Northampton and State of Pennsylvania, have invented a new and Improved Rotary Pump; and I do hereby declare that the following is a full, clear, and exact description of the same, reference being had to the annexed drawings, making a part of this specification, in which—

Figure 1 is a longitudinal vertical section of the cylinder, and piston box of my improved pump, the working parts not being bisected. Fig. 2 is a transverse vertical section of ditto, (*x*) (*x*) Fig. 1 showing the plane of section. Fig. 3, is a detached view of the screw and piston.

Similar letters of reference indicate corresponding parts in the several figures.

This invention consists in the combination of a taper-shaped screw and a scalloped revolving piston.

To enable those skilled in the art to fully understand and construct my invention, I will proceed to describe it.

A represents a cylinder which may be constructed of cast iron, and supported at a suitable height by a framing or supports, (*a,*) (*b*).

The cylinder is formed of two parts which are connected by bolts (*c*) passing through flanches (*d*) as shown clearly in Fig. 2.

B represents a screw which is fitted within the cylinder A. This screw is constructed of metal and is of taper form, corresponding to the bore of the cylinder A, which bore is also of taper form, as shown clearly in Fig. 1. The edge or periphery of the thread (*e*) of the screw is made perfectly smooth as well as the bore of the cylinder so that the edge of the screw will fit snugly and air tight against the inner side of the cylinder. One end (*a'*) of the axis of the screw passes through a stuffing box (*f*) in the head (*g*) of the cylinder and a collar (*g'*) is placed on the axis (*a'*) adjoining the screw B; the axis (*b'*) at the opposite end of the screw fits in the head (*h*) at the opposite end of the cylinder A, the end of the axis (*b'*) bearing against a set screw (*c*) fitted in the head (*h*).

The space between the thread (*e*) of the screw forms a spiral semi-circular groove (*i*) as plainly shown in Figs. 1 and 2.

On the upper part of the cylinder A a box C is placed. This box is placed rather angularly or obliquely with the cylinder A, and a piston D is fitted within said box. This piston works on a pin or axis (*j*) which is attached to a sliding plate (*k*) fitted in the box, the plate (*k*) having a spring (*l*) bearing against its upper end.

The bearings of piston D, are thus made self-adjustable or yielding, so that all choking or injury to the pump by the entrance of solid matter between the piston and screw is prevented.

The piston D may be described as being formed of a circular plate having its edge or periphery scalloped or formed with semi-circular projections (*m*) as shown clearly in Fig. 1. These projections (*m*) correspond in size to the space (*i*) between the thread (*e*) of the screw. The projections are made to fit snugly in said space by the spring (*l*).

A semi-circular plate (*n*) is fitted in the box C directly over the piston D, and below a projection (*o*) on the upper end of the plate (*k*), said projection fitting in a recess in the upper part of the plate (*n*).

The plate (*n*) is movable and rises and falls with the piston; the concave surface of the plate (*n*) constantly rests upon the ends of the projections or scallops (*m*) of the piston. Plate (*n*) thus forms a movable cut-off.

In consequence of the box C being placed obliquely with the cylinder A, the edges of the projections (*m*) of the piston bear at right angles against the thread of the screw as clearly shown in Fig. 3.

At one end of the cylinder A occupied by the larger end of the screw B, a force pipe E is attached, the suction pipe F being at the opposite end of the cylinder and communicating with the support (*b*), which is hollow, and of course communicates with the cylinder A.

In the upper part of the support (*b*) a puppet or other proper valve G is placed.

The operation is as follows:—The screw B is rotated in any proper manner, and as the screw rotates a rotary motion is given the piston D in consequence of the projections (*m*) fitting in the space formed by the thread (*e*), and as one projection passes out of said space the succeeding one follows. By this rotation of the piston D a suction is formed behind each projection (*m*) while in the space formed by the thread of the screw, and the water passes up the support (*b*) into the cylinder, the water that is drawn up by one projection being forced through the pipe E by the succeeding one. Thus a continuous stream is thrown or ejected from the pipe E. The plate (*n*) serves as a cut-off and prevents the water from passing upward around the piston D.

If the screw B becomes loose in the cylinder A by wear, it may be snugly adjusted therein by pressing the larger end of the screw toward the smaller end of the cylinder. The screw and the bore of the cylinder are made of taper form for this purpose. A screw of equal diameter throughout might be used and the bore of the cylinder made of equal diameter, but in case of wear the thread of the screw could not be adjusted snugly within the cylinder.

The valve G serves to prevent the water from escaping from the suction end of the cylinder when the pump is not in operation.

The above pump operates with but little friction, the working parts are not liable to become injured by wear so as to render the operation of the pump imperfect.

I do not claim, broadly, the elevation of water by means of a screw, as screw pumps have long been known and used. Neither do I claim, broadly, the use of scallop-shaped pistons in rotary pumps, as they have been long known. An example is seen in Herbert's work on the steam-engine, page 127, and in B. Holly's patent, Feb. 6, 1855. But to the best of my knowledge and belief, a taper-shaped screw and a scallop-shaped piston have never before been combined together for pumping water. My improvement is therefore a new combination; and by its employment new and useful results are obtained.

My improvement is superior to pumps which consist of a simple screw revolving within a case, because such pumps are dependent for their action upon the attainment of a certain degree of speed; but my pump operates whether the motion be slow or fast.

My invention is superior to those pumps in which two scalloped wheels are employed, because—1st. It is not liable to become choked or injured so much by sand, gravel, &c. 2nd. It is not so liable to wear in its working parts, and therefore will not leak so readily. 3rd. In case of leakage or wear, it can be more easily and quickly put into working order. 4th. The scalloped wheel pumps depend for their efficiency upon the accuracy with which the scallops fit their case. Great exactitude is therefore required in their manufacture; and the parts require to be very smoothly finished and carefully fitted. But my pump requires only ordinary workmanship in its construction, and is therefore more cheaply made than those alluded to.

The scalloped piston D, in my improvement, being placed in a suitable position relative to the pitch of the thread of the screw, and being arranged to vibrate or yield at its axis, allows one scallop to enter fully the semicircular groove of the screw before the preceding scallop leaves said groove; thereby causing the discharge of the water to be regular in quantity, and constant during the rotation of the screw. And further: the scalloped piston being inclosed, and operating with little friction in a casing arranged so as to be easily adjusted, the sides of the piston can be readily made water-tight, in case of leakage by wear, etc., if required, and that too without stopping the pump.

What I claim as new, and desire to secure by Letters-Patent, is:

The combination of a revolving piston D, and taper-shaped screw B, in the manner and for the purposes substantially as described.

ROBERT RAMSDEN.

Witnesses:
W. LLEWELLYN,
E. ROCKWELL.